(12) United States Patent
Girard et al.

(10) Patent No.: US 8,645,544 B2
(45) Date of Patent: Feb. 4, 2014

(54) CROSS PRODUCT/SERVICE MANAGEMENT

(75) Inventors: Edward Christopher Girard, Roswell, GA (US); James A. Bregenzer, Bordentown, NJ (US); Veenod Kurup, Alpharetta, GA (US); Mark Patsy, Duluth, GA (US)

(73) Assignee: Cox Communications, Inc., Atlanta, GA (US)

( * ) Notice: Subject to any disclaimer, the term of this patent is extended or adjusted under 35 U.S.C. 154(b) by 136 days.

(21) Appl. No.: 12/905,308

(22) Filed: Oct. 15, 2010

(65) Prior Publication Data

US 2012/0096164 A1  Apr. 19, 2012

(51) Int. Cl.
  *G06F 15/173* (2006.01)
  *G06F 17/30* (2006.01)
  *G06F 7/00* (2006.01)

(52) U.S. Cl.
  USPC ........... 709/226; 709/223; 707/708; 707/760; 707/764; 707/765

(58) Field of Classification Search
  USPC ................................................ 709/223, 226
  See application file for complete search history.

(56) References Cited

U.S. PATENT DOCUMENTS

| 7,437,518 | B2 * | 10/2008 | Tsien | 711/141 |
| 8,069,246 | B2 * | 11/2011 | Tanimoto | 709/226 |
| 8,219,541 | B2 * | 7/2012 | Magnuson et al. | 707/708 |
| 2010/0023560 | A1 * | 1/2010 | Erb | 707/202 |
| 2010/0153553 | A1 * | 6/2010 | Sheth et al. | 709/226 |
| 2010/0274901 | A1 * | 10/2010 | Eidenschink | 709/226 |
| 2011/0302290 | A1 * | 12/2011 | Westerfeld et al. | 709/223 |

\* cited by examiner

*Primary Examiner* — Yemane Mesfin
*Assistant Examiner* — Peter Chen
(74) *Attorney, Agent, or Firm* — Merchant & Gould (57) ABSTRACT

Cross product/service management of subscriber products/services is provided. When multiple product/services orders or instructions are received for a shared service or resource (e.g., a unified voicemail box/system) from two or more order or instruction entry systems (e.g., wireline and wireless telephone systems), the multiple orders or instructions are passed to a shared product/services provisioning manager for management of the orders or instructions with respect to the shared service or resource. If the orders require a change to the shared service or resource, the orders or instructions are mediated for concurrent or otherwise conflicting requests to the shared service or resource. Mediated requests are formatted for receipt and use by the shared service or resource and are then passed to a network element responsible for the shared service or resource for implementation.

20 Claims, 3 Drawing Sheets

CROSS PRODUCT/SERVICE MANAGEMENT

BACKGROUND

With the advent of modern communications systems and networks, a multitude of services are provided to subscribers. For example, a given communications user may subscribe to television services via a cable or satellite-based television services provider, wireless and wireline telephone services, wireless and wireline data services, Internet services, and the like. In many cases, some or all of these services are provided to a subscriber by a single services provider.

Due to rapid development of such services by services providers, a given services provider may offer each of such services independently of each other with multiple subscription entry points or services management systems utilizing heterogeneous networks to deliver the services. For example, a wireline telephone services system may purchase or develop a wireless telephone system that operates as a separate operating entity from the wireline services system. The services provider then may develop Internet services and cable or satellite-based television services. Each of these disparate services may be operated separately in terms of services provisioning and management.

In some instances, it is desirable to offer cross product/services provisioning where a single or unified or shared product or service is provided across multiple services systems. For example, in order to provide subscribers of both wireline and wireless telephone services a better voicemail experience, a services provider may wish to provide a "unified" voicemail box to the subscriber wherein both wireline and wireless voicemail messages may be accessed and managed by the subscriber via a single access point. In such a case, a single voicemail box/system may be utilized or two separate voicemail boxes/systems (wireline and wireless) may be linked to act as a single or unified voicemail box. As should be appreciated, a variety of other cross products or cross services provisioning may occur when a service or product is shared or accessed by two or more client systems (e.g., wireline telephone, wireless telephone, television service, Internet services, etc.).

In such situations, a problem often occurs when services management (e.g., creation, update, deletion, etc.) commands are passed to a unified or cross product/services system (e.g. a unified voicemail box) from two or more different service provision systems. For example, an order to change the memory capacity of a unified voicemail box/system, instructions may be passed to the unified voicemail box/system from both a wireline telephone system and from a wireless telephone system. If the instructions from the two disparate systems conflict in any way, changes may be made or provisioned on the receiving device or system that do not provide the services desired or required by the requesting services subscriber. That is, conflicting product/services provisioning changes may be received at a given network or product element (e.g. a voicemail box) that result in a corruption of data or operating instructions at the target element.

Activating, deactivating, updating or otherwise changing products or services across multiple systems often leads to a one to one mapping between order entry interfaces, provisioning systems and network elements needed to provide products or services. Such one to one mapping can result in the duplication of identical services across each of these heterogeneous networks or systems, duplication of back office systems (e.g., order entry systems and portals, billing systems, etc.) to match the provisioning system, and an inability to mediate transactions across multiple systems in the case where the network element is a shared component between two services, such as a shared voicemail box or electronic mail server. Some disadvantages of such a one to one mapping approach include, but are not limited to, forcing additional costs and inefficiencies into the product/service providers due to the overhead of running and maintaining multiple systems that provide similar or same functionalities, hindering product/service providers in offering new service combinations utilizing services that span product/service lines, and creating data integrity issues/problems when multiple provisioning systems access the same network elements.

Thus, a need exists for cross product/service management to provide for managed changes to shared resources (i.e., products and/or services) provided from multiple service product/services provider systems. It is with respect to these and other considerations that the present invention has been made.

SUMMARY

The above and other problems are solved by providing cross product/service management of subscriber products/services. According to embodiments, when multiple product/services orders or instructions are received for a shared service or resource (e.g., a unified voicemail box/system) from two or more order or instruction entry systems (e.g., wireline and wireless telephone systems), the multiple orders or instructions are passed to a shared product/services provisioning manager. At the shared product/services provisioning manager, the multiple orders are received at a web services system operative to determine whether the received orders require a change to the shared service or resource, or whether the orders are read-only requests for information from the shared service or resource. If the orders require a change (e.g., creation, update or deletion applied to a network element, device or program that provides the shared service or resource) to the shared service or resource, the orders or instructions are passed to a synchronization module that is responsible for mediating concurrent or otherwise conflicting requests to the shared service or resource. Requests mediated by the synchronization module or read-only requests from the web services system are then passed to a network element adaptor that is operative to translate (e.g., format) the requests so they may be understood and processed by a network element responsible for the shared service or resource, for example, a voicemail system responsible for providing a unified voicemail box for a wireline and wireless telephone services subscriber.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above cross product/service management of subscriber products/services is provided. When multiple product/services orders or instructions are received for a shared service or resource (e.g., a unified voicemail box/system) from two or more order or instruction entry systems (e.g., wireline and wireless telephone systems), the multiple orders or instructions are passed to a shared product/services provisioning manager for management of the orders or instructions with respect to the shared service or resource. If the orders require a change to the shared service or resource, the orders or instructions are mediated for concurrent or otherwise conflicting requests to the shared service or resource. Mediated requests are formatted for receipt and use by the shared service or resource and are then passed to a network element responsible for the shared service or resource for implementation.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
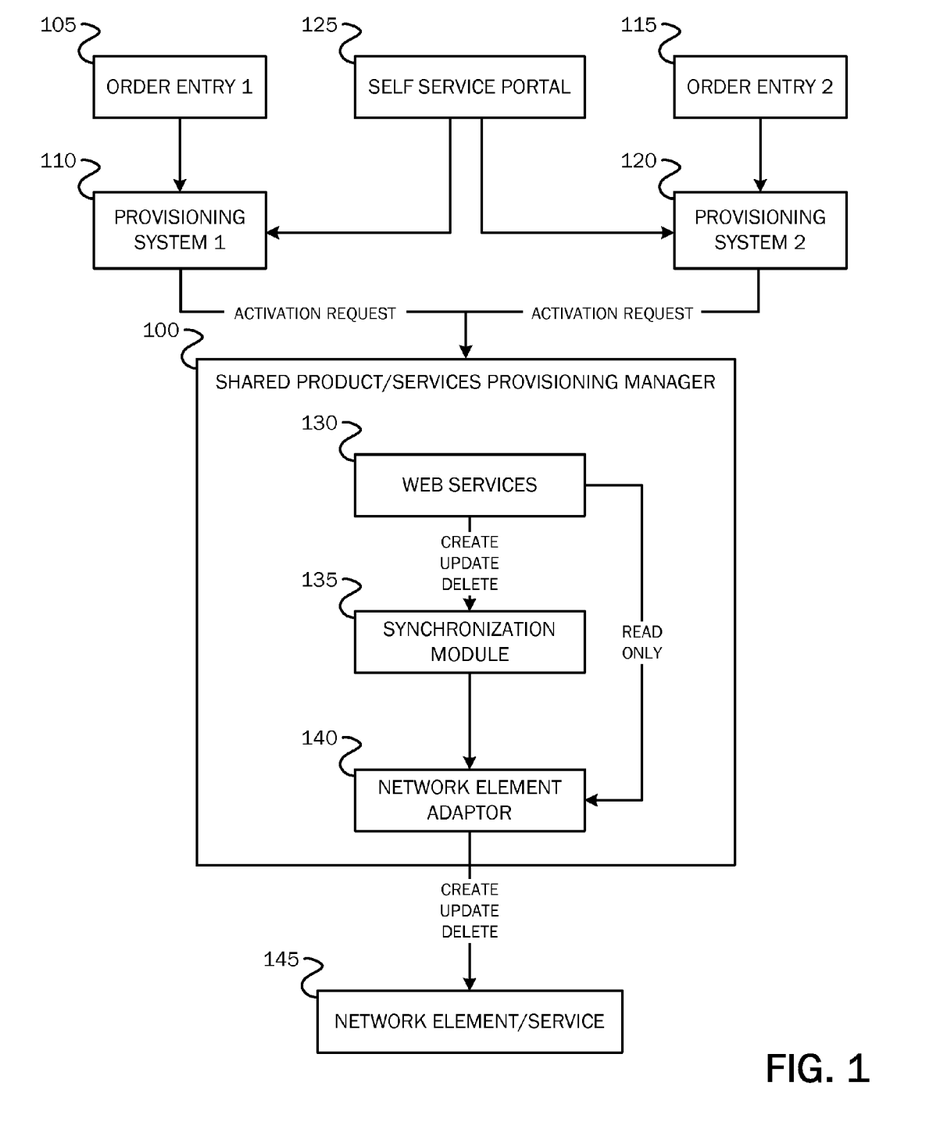
FIG. 1 is a simplified block diagram of a system architecture with which embodiments of the present invention may be implemented.

FIG. 1 is a simplified block diagram of a system architecture with which embodiments of the present invention may be implemented. The system architecture illustrated in FIG. 1 is illustrative of a system with which product/services orders and instructions received from multiple product/services providers that are directed to a single shared service/resource may be processed to prevent concurrent or conflicting instructions from diminishing the effectiveness of the shared product/resource or from generating an undesired result in the shared product/resource.

According to embodiments, a shared product/resource may be any system or software application that is utilized by multiple communications systems, for example, a unified voicemail box that receives voicemail from both a wireline and a wireless communication system, a unified electronic mail box that receives mail from multiple data systems, and the like. Product or services orders/instructions that may be passed to such a shared product or resource may included activation requests to start such a shared resource, deactivation requests to stop such a shared resource, change requests for updating such a resource, creation requests for building such a resource, and the like. In any of these cases, a service order/request may include the creating, adding, updating and or changing one or more attributes (e.g., service connections, programming code changes, call processing sequencing, etc.) of a given shared resource.

For example, if a subscriber utilizes a wireline voicemail box and subsequently adds a wireless service, a service order may be sent to the voicemail system to create a connection to the voicemail box from the wireless service. If the change requires an instruction from both the wireline service and the wireless service, the multiple change orders may be in conflict at the voicemail system, and an undesired result may occur. For example, an order from the wireless service to connect the voicemail box to the wireless directory number may inadvertently cause the voicemail system to disconnect the subscriber's wireline connection to the voicemail system and box. As described below, the system illustrated in FIG. 1 may be utilized for passing orders/instructions from each of the disparate systems to the shared resource in a manner that ensures the operating integrity of shared resource, for example, so that changes to the setup or programming of the voicemail box result in an outcome desired by the subscriber.

For another example, if a subscriber of a wireline telephone service, a wireless telephone service and an Internet protocol (IP) based telephone service desires to change the memory capacity of a unified voicemail box, a problem might occur if an instruction is received from each of the three telephony systems to the shared resource (i.e., the unified voicemail box) directing an increase or decrease in the subscribed memory capacity. That is, if the instructions are received from each of the three example telephony systems concurrently, processing of the concurrently received instructions at the subject voicemail box may be corrupted causing operating errors or errors in the resulting memory capacity. Similarly, if such an instruction is received by the example voicemail box from one of the three example systems followed by receipt of a different instruction from one of the other example systems, a conflict might occur between the separately received instructions causing problems at the example voicemail box.

Referring then to FIG. 1, order entry points 105 and 115 are illustrative of entry points through which a subscriber may request changes to one or more resources provided by a given services provider. The self service portal 125 is illustrative of an access point provided by a services provider for allowing a subscriber to order product/services updates or changes on a self-service basis. For example, the order entry points 105, 115 may be back office administrative order processing units of a wireline or wireless telephone services provider, a cable television or satellite-based television services provider, an Internet services provider, a wireline or wireless data services provider, and the like. Similarly, the self service portal 125 may be an access point, for example, a web services system for accessing products/services of such a services provider for ordering products or services or for making changes to existing products or services.

According to embodiments, each of the order entry points 105, 115 and the self service portal 125 may be associated with independent services providers, or each of these entry points may be provided by a single services provider operative to provide multiple disparate services, for example, wireline telephone services, wireless telephone services, Internet services, data services, television services, and the like. For example, the order entry point 105 may be associated with a wireline telephone services division of a communications services provider, and the order entry point 115 may be associated with a wireless services division of the same communications services provider wherein the wireline and wireless services provision of the communications services provider are operated independently of each other.

The provisioning systems 110, 120 are illustrative of systems employed by a given product/services provider for provisioning end point products or services as desired by subscribers. For example, the provisioning systems 110, 120 operating under the order entry points 105, 115 or operating under the self service portal 125 may include systems operative to provide a given telecommunications service. For example, if a subscriber places an order for Internet services with his/her communications services provider through the entry point 125, the provisioning system 110 may be operative for provisioning the required Internet data services to the requesting subscriber via wireline or wireless connectivity to the subscriber's home, place of business, or other desired location. As should be appreciated, the provisioning systems 110, 120 may also be utilized for processing changes to existing products/services provided by a given products/services provider. For example, if a given subscriber utilizes Internet data services at a given speed and bandwidth, the provisioning systems 110, 120 may be utilized for processing changes to the bandwidth and/or data speed provided to the subscriber upon request by the subscriber through the respective order entry points 105, 115, 125.

Referring still to FIG. 1, when multiple product/services orders, instructions or service management requests (hereafter referred to collectively as orders) are received for a shared service or resource (e.g., a unified voicemail box) from two or more order entry points or systems 105, 115, or from a self service entry portal 125, as described above, the multiple orders are passed to a shared product/services provisioning manager 100 for managing the orders with respect to a product or service. At the shared product/services provisioning manager 100, a web services system 130 is operative to receive each product/services order from one or more order entry points 105, 125, 115. For example, if the order entry point 105 is associated with a wireline telephone system, and if the order entry point 115 is associated with a wireless telephone system, and if an order is received from each of the respective order entry points for changing the setup or programming of an end point product or service, for example, a voicemail box, electronic mail system, data services system, Internet provision system, or the like, the web services system 130 of the shared product/services provisioning manager 100 is operative for receiving the disparate orders and for determining the nature of the received orders.

According to an embodiment, the web services system 130 may determine whether the received orders are associated with a read-only request for information from the subject product or services. If a given order is associated with a read-only information request, the web services system 130 is operative to pass the read-only information request to a network element adaptor 140, described below.

If one or more of the product/services orders received by the web services system 130 are associated with management of the target product or service, the web services system 130 passes the received one or more orders to a synchronization module 135. That is, if the received orders result in the creation of a product or service the updating of the setup or programming of a program or service, or the deletion of a setup item or programming attribute of the product or service, then the associated order is passed to the synchronization module 135.

The synchronization module 135 is a software application module operative to mediate multiple received orders directed to a shared product/resource to prevent conflicting orders from causing changes to the shared product or resource that may create an undesired outcome. For example, if multiple orders are received at the synchronization module 135 that are directed to a shared product or resource, and the multiple orders are received such that concurrent processing of the multiple orders may cause an undesired result, the synchronization module 135 may be operative to determine an appropriate processing order for the received orders to prevent the undesired outcome. For example, if a first order is received from a wireline telephone system requiring memory capacity of a voicemail box to be increased by 25%, and a second concurrent order is received from a wireless telephone system requiring that memory capacity of the same voicemail box is increased by 35%, the two orders are in conflict. According to embodiments, the synchronization module 135 may be operative to resolve the conflict between the two orders so that an undesired or erroneous change to the example voicemail box is avoided. For example, in such a case the synchronization module 135 may be programmed to increase the memory capacity of the example voicemail box to the higher level, for example, 35% as opposed to 25%.

For another example, if multiple instructions are received at the synchronization module for applying to a given product or service, application of each of the multiple instructions may be required according to a prescribed order to prevent an undesired outcome in the target product or service. According to embodiments, the synchronization module 135 may be operative to cause the application of such multiple orders according to a prescribed order as opposed to applying such orders to the target product/service randomly or in the order received which may cause an undesired result.

As should be appreciated, the discussion of an example voicemail box and orders/instructions applied to the example voicemail box is for purposes of illustration only and is not limiting of the vast number of products/services for which multiple orders may be received from disparate services providers or systems, the application of which may be managed by the shared product/services provisioning manager 100, as described herein. For example, a subscriber may receive television services through a cable services set top box associated with his/her television set. In addition, the subscriber may receive Internet Protocol based data services through the same set top box from the same services provider as the television services, but from a different provisioning system 120 than a provisioning system 110 from which the television services are received. According to embodiments, an order may be received for altering the processing capacity of the example set top box from each of the television services provisioning system 110 and from the Internet Protocol based services provisioning system 120 that may be in conflict without management by the shared product/services provisioning manager 100, as described herein.

Referring still to FIG. 1, read-only information requests from the web services system 130 and mediated/synchronized orders processed by the synchronization module 135 are passed to a network element adaptor 140. According to embodiments, the network element adaptor 140 is a software application module operative to format or structure the received request/orders so that they may be understood and processed by the target product/service. For example, if the target product/service is a unified voicemail box operative to receive voicemail messages from both a wireline telephone system and a wireless telephone system, the unified voicemail box may be programmed to receive read-only requests or operational change orders/requests according to a structured language such as the Extensible Markup Language (XML). In this example case, the network element adaptor 140 would be operative to format a read-only request received from the web services system 130 or an order/request received from the synchronization module 135 according to XML before passing the request to the subject product/service, for example, the voicemail box. Thus, when the example voicemail box receives the read-only information request or operating order/request, the target product/service will be able to understand the received order/request according to its own processing requirements.

As should be understood, the example formatting according to XML is for purposes of illustration only and is not limiting of the vast number of formatting and/or computing languages with which an order/request may be structured by the network element adaptor. For example, a given end product/service may require that orders/requests be passed according to a given database query. Thus, the network element adaptor may format the order/request according to the required database query formatting before sending the order/request to the target product/service.

Referring still to FIG. 1, the network element/service 145 is illustrative of any network device or software application responsible for providing a target product/service for which multiple orders/requests may be received, as described herein. As described above, an example voicemail box accessible by both a wireline and wireless telephone system is described as a shared resource for which multiple orders/requests may be received. According to this example, the network element/service 145 may be in the form of a voicemail platform and associated software operative to provide the voicemail box and operative to receive orders/requests from multiple provisioning systems directed to the example voicemail box. Other shared resources may include an electronic mail service that may receive and process electronic mail from multiple services, for example, from wireline and wireless data services. Other examples include the aforementioned set top box with which television services may be received from a cable services system, and with which Internet data services may be received from a broadband/Internet services provider operating with the cable services system. As should be appreciated the network element/service 145 may include any device or software application operative to provide a product or service that may serve as a shared product/service across multiple service provider systems.

According to embodiments, in some cases, information may be returned from the network element/service 145 back through the network element adaptor 140 for ultimate return to a requesting provisioning system 110, 120 for receipt by a provisioning system administrator, or by a subscriber to the product or service associated with the network element/service 145. For example, if a read-only request is passed to the network element/service 145 for information, for example, a listing of voicemail messages received in a unified voicemail box, the requested data may be passed back through the network element adaptor 140 for formatting as required by the requesting provisioning system 110, 120 or by a requesting subscriber through the entry point 105, 115 or self-service portal 125.

Figure 2:
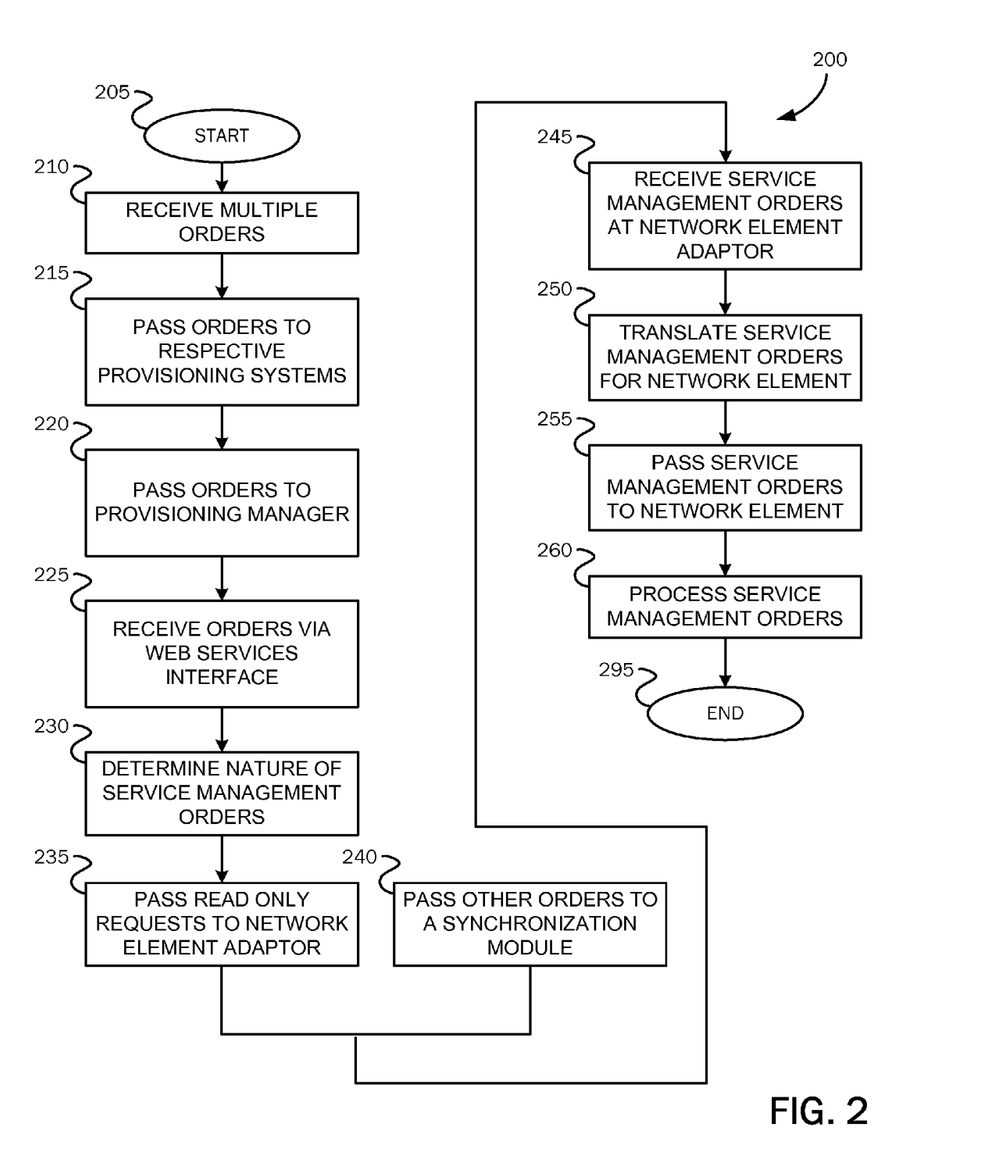
FIG. 2 is a flow diagram illustrating a routine for cross product/services management.

Having described a system architecture with which embodiments of the present invention may be practiced with respect to FIG. 1, FIG. 2 is a flow diagram illustrating a routine for cross product/services management. For purposes of illustration, the routine 200 illustrated in FIG. 2 will be described with reference to the receipt of multiple change orders received for application to a unified electronic mail service operative to receive, display and process electronic mail messages from both a wireline telecommunications service and a wireless telecommunications service. Consider for example that a subscriber requests a change to his/her electronic mail system to allow electronic mail items received by the example electronic mail system to be automatically forwarded to a forwarding electronic mail address. Because the example subscriber receives electronic mail messages through both a wireline telecommunications system and a wireless telecommunications system, both the wireline telecommunications system and the wireless telecommunications system must send orders through respective provisioning systems 110, 120 for ordering the desired change to the subscriber's electronic mail system.

Referring then to FIG. 2, the routine 200 begins at start operation 205 and proceeds to operation 210 where multiple service management orders directed to the network element/service 145 (e.g., the subscriber's electronic mail system) are received via different order entry points 105, 115, 125. At operation 215, the service management orders are passed through provisioning systems 110, 120 associated with respective provider systems, for example, disparate wireless and wireline data systems.

At operation 220, the two orders directed to the example electronic mail system are passed to the shared product/services provisioning manager 100, as described above with reference to FIG. 1. At operation 225, the received orders/requests are passed to the web services system 130 for determining the nature of the received orders/request. According to an embodiment, the web services system 130 parses the received orders/requests and determines whether that the received orders/requests require changes to the target electronic mail system or whether any portion of the orders/requests are read-only information requests.

At operation 235, if the web services system determines any portion of the received orders/requests include read-only information requests requiring information from the target product/service (e.g., electronic mail system), the web services system passes the read-only orders/requests to the network element adaptor 140. For example, one of the two received orders/requests (or a portion of one or both of the two received orders/requests) directed to the example target electronic mail system may require read-only information, for example, a listing of all electronic mail items forwarded to the alternate electronic mail address in the last seven days. As described above with reference to FIG. 1, the read-only information request portion of one or both of the received orders/requests is passed from the web services system 130 directly to the network element adaptor 140 for formatting and/or structuring, as described below.

At operation 240, the two orders/requests received from the example wireline and wireless telecommunications systems are passed to the synchronization module 135 by the web services system 130. At operation 240, the synchronization module 135 resolves any conflicts between the two received orders/requests so that the received orders/requests will be applied to the target product/service in an appropriate manner. For example, if it is required that the example order of a forwarding electronic mail address be applied first from the wireline telecommunications service before any changes are made from the wireless telecommunications service, then the synchronization module 135 will direct the application of the two received orders/requests according to the preferred order. For another example, if it is determined by the synchronization module 135 that the two received orders/requests are in conflict with each other, for example, where the example forwarding electronic mail addresses received from the two systems are different, the synchronization module 135 may be programmed to resolve the conflict in the favor of one of the two competing orders/requests, or the synchronization module 135 may be programmed to pass an information request back through the web services system 130 to the requesting provisioning system 110, 120 to receive a corrected order/request for resolving the conflict. According to one embodiment, the synchronization module 135 may also be operative to generate a new consolidated order/request that includes the substance of both received orders, wherein the consolidated order/request will be sent to the network element/service for processing.

After the synchronization module 135 has mediated the received service management orders/requests to mitigate any conflicts in the received orders/requests, then the mediated orders/requests, and any read-only information requests received from the web services system 130 are passed to the network element adaptor 140. At operation 245, the network element adaptor 140 formats or structures the received orders/requests for application to the target product/service. For example, if the target product/service requires that instructions be received according to a particular data structuring language, or according to a particular data query type, then the network element adaptor will structure or format the received orders/requests accordingly at operation 250.

At operation 255, the mediated and formatted/structured orders/requests are passed to the appropriate network element/service at which the target product/service is operated. For example, if the electronic mail system of the requesting subscriber is operated at a given electronic mail server, then at operation 255, the orders/requests are passed to the appropriate electronic mail server for application to the subscriber's electronic mail service. At operation 260, the mediated and formatted/structured orders/requests are processed by the target product/service, for example, the subscriber's electronic mail service, and the requested changes, updates, instructions, etc. are applied as requested by subscriber. The routine 200 ends at operation 295.

Figure 3:
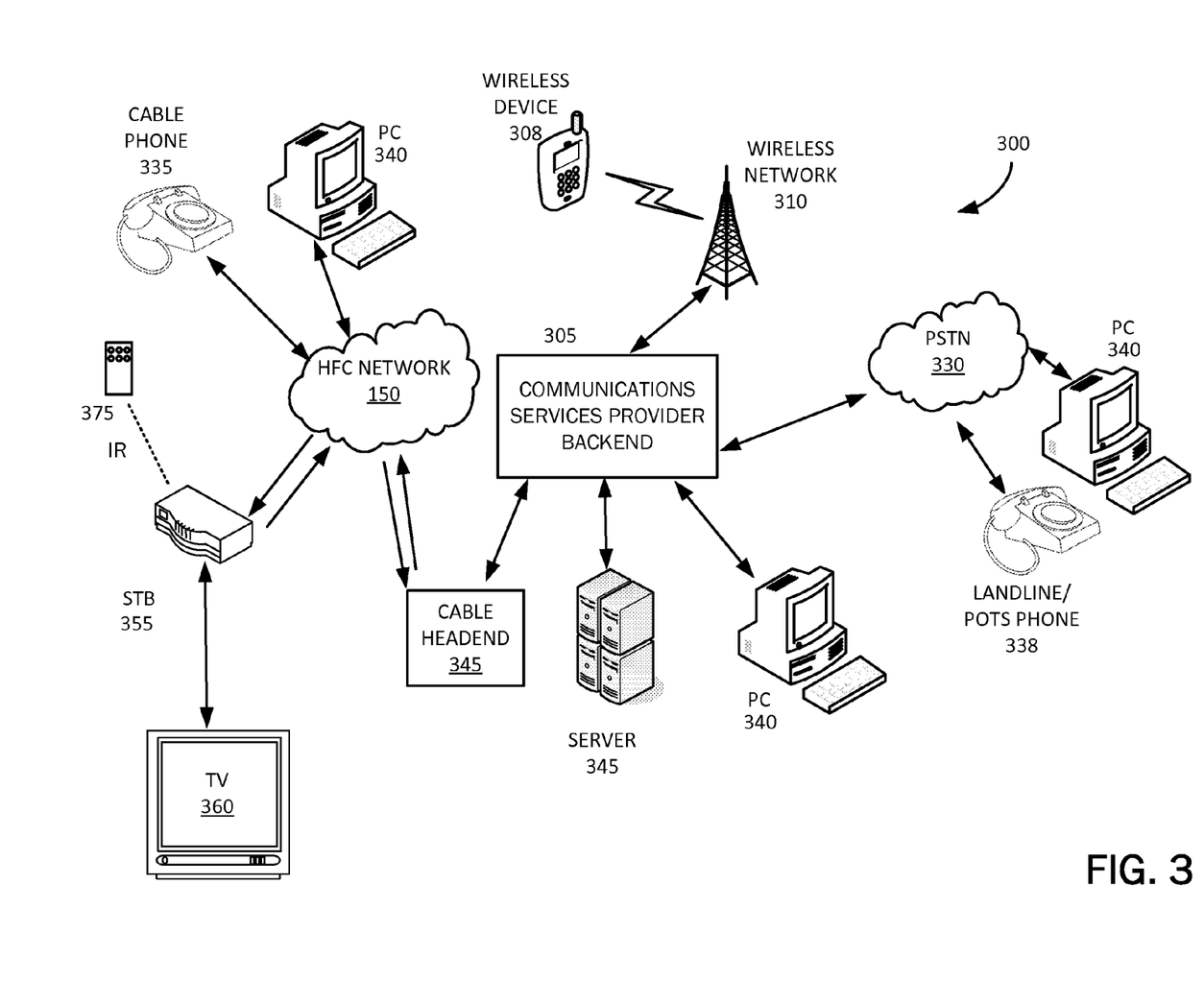
FIG. 3 is a simplified block diagram of a multiple product/services provider system in which embodiments of the present invention may be practiced.

As described above with reference to FIGS. 1 and 2, a communications services provider may provide services via multiple communications systems, for example, a wireline telephony and data system, a wireless telephony and data system, a cable television of satellite-based television, data, and telephony system, and the like. And, as discussed above, oftentimes a share resource, for example, a unified voicemail box, unified electronic mail system, data storage site, and the like may be utilized by a subscriber in association with multiple disparate communications systems, for example, wireline and wireless telephony systems. FIG. 3 is a simplified block diagram illustrating a system architecture of a communications services provider in which embodiments of the present invention may be implemented. As illustrated in FIG. 3, a communications services provider system backend 305 is illustrative of backend administrative and processing services of a communications services provider. For example, the communications services provider backend 305 may house administrative functionality such as billing, customer subscription data, access to third-party services such as news, weather, sports, miscellaneous content, electronic mail systems, voicemail systems, customer authentication systems, and the like. The server 345 is illustrative of one or more general purpose computing systems and data storage systems for processing and storing data associated with customer/subscriber services.

On the left side of FIG. 3, a cable television services system is illustrated with which the communications services provider may provide a variety of communications services via a cable television network. The cable headend 345 is illustrative of a computing and data deliver system through which a variety of television content, data services, and cable telephony services may be passed through a hybrid fiber coax network 150 to end point devices. For example, Broadband/Internet services may be passed through the cable television system to a computer 340, cable telephony services may be passed through the cable television system to the cable-enabled telephone 335, and a variety of television viewable content may be passed through the set top box 355 to the television 360. As should be appreciated, according to some embodiments, Broadband/Internet services and cable telephony services may be passed from the communications services provider through the cable television network without passing the data and signaling associated with these systems through the cable head end and hybrid fiber coax network 150 as illustrated in FIG. 3.

Along the upper side of FIG. 3, a wireless telephony/data network 310 is illustrated with which the communications services provider may provide wireless telephone services and data services to a wireless device 308. The wireless device 308 is illustrative of any communications device or wireless computing device, for example, a wireless handheld computing device, laptop computer, or desktop computer configured for receiving wireless communications and data via the wireless network 310.

Along the right side of FIG. 3, a public switched telephone network 330 is illustrated with which the communications services provider may provider wireline telephony and data services through the public switch telephone network 330 to the land line telephone 338 or to the computer 340.

As described above with reference to FIGS. 1 and 2, the communications service provider may offer or provide shared products and/or resources, for example, a unified voicemail box, to a subscriber of two or more communications systems. For example, a user of the wireless device 308 and of the land line telephone 338 may utilize a unified voicemail box provided by the communications services provider that may be maintained at the communications services provider backend 305. The unified mailbox may be a single voicemail box or the unified voicemail box may be two voicemail boxes located at disparate communications services but that are linked together to provide the customer with a unified voicemail box experience.

As described above, if changes are required to the setup, programming, or other attributes of the shared resource, for example, the unified voicemail box, or instructions may be received by multiple disparate communications order entry points 105, 115 which may result in conflicting requests being passed to the shared resource. The shared product/services provisioning manager 100, illustrated and described with reference to FIG. 1, may be utilized by the communications services provider at the communications services provider backend via the server system 345 to resolve and mediate orders/instructions, including read-only information requests, directed to the shared product/resource.

In various and alternative embodiments, the invention may be used in combination with any number of computer systems, such as in desktop environments, laptop or notebook computer systems, multiprocessor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

As described herein, cross product/service management of subscriber products/services is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of processing service orders from disparate systems directed to a shared resource, comprising:
   receiving a first service order directed to the shared resource via a first service order entry point;
   receiving a second service order directed to the shared resource via a second service order entry point;
   determining whether one or both of the first and second service orders are a read-only information request directed to the shared resource;
   if the one or both of the first and second service orders are the read-only information request directed to the shared resource, formatting the one or both of the first and second service orders via a network element adaptor operative to format the one or both of the first and second service orders for receipt and use by the shared resource;
   if the one or both of the first and second service orders are not the read-only information request directed to the shared resource:
      determining whether the one or both of the first and second service orders provide for a change to the shared resource;
         if the first and second service orders provide for the change to the shared resource, determining whether the first and second service orders provide for a conflicting change to the shared resource;
         if the first and second service orders provide for the conflicting change to the shared resource, mediating the conflicting change between the first and second service orders such that the first and second service orders do not provide the conflicting change to the shared resource, wherein mediating the conflicting change between the first and second service orders include generating a third service order that consolidates the first and second service orders in a processing order that prevents the conflicting change, wherein the third service order does not provide the conflicting change to the shared resource; and
         if the first and second service orders provide for the conflicting change to the shared resource, passing the third service order to the shared resource for application of the third service order to the shared resource.

2. The method of claim 1, after mediating the conflicting change between the first and second service orders, formatting the third service order for receipt and use by the shared resource.

3. The method of claim 2, wherein formatting the third service order for receipt and use by the shared resource includes formatting the third service order via the network element adaptor operative to format the third service order for receipt and use by the shared resource.

4. The method of claim 1, after formatting the one or both of the first and second service orders that are the read-only information request, passing the formatted one or both of the first and second service orders to the shared resource for requesting read-only information from the shared resource.

5. The method of claim 1, wherein determining whether the one or both of the first and second service orders provide the change to the shared resource includes determining whether the one or both of the first and second service orders provide for activating an attribute of the shared resource.

6. The method of claim 1, wherein determining whether the one or both of the first and second service orders provide for the change to the shared resource includes determining whether the one or both of the first and second service orders includes deactivating an attribute of the shared resource.

7. The method of claim 1, wherein determining whether the one or both of the first and second service orders provide for the change to the shared resource includes determining whether the one or both of the first and second service orders includes updating an attribute of the shared resource.

8. The method of claim 1, wherein receiving the first and second service orders directed to the shared resource includes receiving the first and second service orders directed to the shared resource via first and second provisioning systems, wherein each of the first and second provisioning systems are operative to apply a received service order to the shared resource.

9. The method of claim 1, wherein determining whether the one or both of the first and second service provide for the change to the shared resource includes determining whether the one or both of the first and second service provide for the change to the shared resource via a web services system.

10. The method of claim 1, wherein determining whether the one or both of the first and second service orders are the read-only information request directed to the shared resource includes determining whether the one or both of the first and second service orders are the read-only information request directed to the shared resource via a web services system.

11. A system for mediating and processing service orders from disparate systems directed to a shared resource, comprising:
   a computer system including data stored in memory that, when a processed, cause the computer system to provide:
      a shared service provisioning manager module operative
         to receive a first service order directed to the shared resource;
         to receive a second service order directed to the shared resource;
      the shared service provisioning manager module including a web services system operative
         to determine whether one or both of the first and second service orders are a read-only information request directed to the shared resource;
         if the one or both of the first and second service orders are the read-only information request directed to the shared resource, to pass the one or both of the first and second service orders that are the read-only information request to a network element adaptor for formatting the one or both of the first and second service orders that are the read-only information request for receipt and use by the shared resource;

if the one or both of the first and second service orders are not the read-only information request directed to the shared resource:

to determine whether the one or both of the first and second service orders provide for a change to the shared resource; and if the one or both of the first and second service orders provide for the change to the shared resource, to pass the one or both of the first and second service orders that provide for the change to the shared resource to a synchronization module;

the shared service provisioning manager module including the synchronization module operative to determine whether the one or both of the first and second service orders provide for the change to the shared resource provide for a conflicting change to the shared resource; and to mediate the conflicting change between the first and second service orders such that the first and second service orders do not provide the conflicting change to the shared resource, wherein mediating the conflicting change between the first and second service orders include generating a third service order that consolidates the first and second service orders in processing order that prevents the conflicting change, wherein the third service order does not provide the conflicting change to the shared resource; and to pass the third service order to the shared resource for application of the third service order to the shared resource.

12. The system of claim 11, wherein the shared service provisioning manager module further includes the network element adaptor operative to receive the first and second service orders from the synchronization module and to format the first and second service orders for receipt and use by the shared resource.

13. The system of claim 11, wherein the third service order is formatted order for receipt and use by the shared resource.

14. A computer readable storage device containing computer executable instructions, which when executed perform a method of processing service orders from disparate systems directed to a shared resource, comprising:

receiving a first service order directed to the shared resource via a first service order entry point;

receiving a second service order directed to the shared resource via a second service order entry point;

determining whether one or both of the first and second service orders are a read-only information request directed to the shared resource;

if the one or both of the first and second service orders are the read-only information request directed to the shared resource:

formatting the one or both of the first and second service orders via a network element adaptor that are operative to format the read-only information request for receipt and use by the shared resource;

passing the formatted one or both of the first and second service orders that are the read-only information request to the shared resource;

if the one or both of the first and second service orders are not the read-only information request directed to the shared resource:

determining whether the one or both of the first and second service orders provide for a change to the shared resource;

if the first and second service orders provide for the change to the shared resource, determining whether the first and second service orders provide for a conflicting change to the shared resource; and if the first and second service orders provide for the conflicting change to the shared resource, mediating the conflicting change between the first and second service orders such that the first and second service orders do not provide the conflicting change to the shared resource, wherein mediating the conflicting change between the first and second service orders include generating a third service order that consolidates the first and second service orders in a processing order that prevents the conflicting change, wherein the third service order does not provide the conflicting change to the shared resource; and if the first and second service orders provide for the conflicting change to the shared resource, passing the third service order to the shared resource for application of the third service order to the shared resource.

15. The computer readable storage device of claim 14, after mediating the conflicting change between the first and second service orders, formatting the third service order for receipt and use by the shared resource.

16. The computer readable storage device of claim 14, after mediating the conflicting change between the first and second service orders, formatting the third service order for receipt and use by the shared resource.

17. The computer readable storage device of claim 16, wherein formatting the third service order for receipt and use by the shared resource includes formatting the third service order via the network element adaptor operative to format the third service order for receipt and use by the shared resource.

18. The computer readable storage device of claim 14, wherein determining whether the one or both of the first and second service orders provide the change to the shared resource includes determining whether the one or both of the first and second service orders provide for activating an attribute of the shared resource.

19. The computer readable storage device of claim 14, wherein determining whether the one or both of the first and second service orders provide for the change to the shared resource includes determining whether the one or both of the first and second service orders include deactivating an attribute of the shared resource.

20. The computer readable storage device of claim 14, wherein determining whether the one or both of the first and second service orders provide for the change to the shared resource includes determining whether the one or both of the first and second service orders include updating an attribute of the shared resource.

* * * * *

UNITED STATES PATENT AND TRADEMARK OFFICE
CERTIFICATE OF CORRECTION

PATENT NO. : 8,645,544 B2  
APPLICATION NO. : 12/905308  
DATED : February 4, 2014  
INVENTOR(S) : Girard et al.

Page 1 of 1

It is certified that error appears in the above-identified patent and that said Letters Patent is hereby corrected as shown below:

IN THE CLAIMS:

Col. 12, line 38, claim 9: "second service provide" should read --second service orders provide--

Col. 12, line 40, claim 9: "second service provide" should read --second service orders provide--

Col. 12, line 52, claim 11: "when a processed," should read --when processed,--

Signed and Sealed this  
Sixth Day of January, 2015

Michelle K. Lee  
*Deputy Director of the United States Patent and Trademark Office*